(12) United States Patent
Pickelman

(10) Patent No.: US 6,971,405 B2
(45) Date of Patent: Dec. 6, 2005

(54) CHECK VALVE FOR FUEL PUMP

(75) Inventor: Dale M. Pickelman, Saginaw, MI (US)

(73) Assignee: Delphi Technologies, Inc., Troy, MI (US)

(*) Notice: Subject to any disclaimer, the term of this patent is extended or adjusted under 35 U.S.C. 154(b) by 281 days.

(21) Appl. No.: 10/267,981

(22) Filed: Oct. 9, 2002

(65) Prior Publication Data

US 2004/0069353 A1   Apr. 15, 2004

(51) Int. Cl.[7] ............................................. F16K 15/06
(52) U.S. Cl. .................. 137/540; 137/543.13; 251/333
(58) Field of Search ........................... 137/454.4, 540, 137/543.13, 543.17; 251/333, 337

(56) References Cited

U.S. PATENT DOCUMENTS

| | | |
|---|---|---|
| 287,004 A | 10/1883 | Cullingworth |
| 774,340 A | 11/1904 | Smith |
| 1,759,081 A | 5/1930 | Anderson |
| 2,011,333 A | 8/1935 | Clifton |
| 2,080,760 A | 5/1937 | Condon |
| 2,206,356 A | 7/1940 | Hutchings |
| 2,285,997 A | 6/1942 | Mino |
| 2,342,659 A | 2/1944 | Grove et al. |
| 2,367,106 A | 1/1945 | Dolch |
| 2,380,459 A | 7/1945 | Niesemann |
| 2,564,894 A | 8/1951 | Glasgow |
| 2,569,316 A | 9/1951 | Jerman |
| 2,599,898 A | 6/1952 | Dalrymple |
| 2,646,071 A | 7/1953 | Wagner |
| 2,752,933 A | 7/1956 | Olson |
| 2,809,660 A * | 10/1957 | Becker .................... 137/514.3 |
| 2,842,150 A | 7/1958 | Olson |
| 2,884,952 A | 5/1959 | Mason et al. |
| 2,939,475 A | 7/1960 | Roach |
| 2,949,931 A | 8/1960 | Ruppright |
| 3,026,903 A | 3/1962 | Roach |
| 3,039,658 A | 6/1962 | Hoelle |
| 3,057,374 A | 10/1962 | Gondek |
| 3,125,119 A | 3/1964 | Richgels |
| 3,180,354 A | 4/1965 | Grose |
| 3,202,177 A | 8/1965 | Klein et al. |
| 3,234,959 A | 2/1966 | Feinberg |
| 3,272,218 A | 9/1966 | Johnson |
| 3,294,116 A | 12/1966 | Trémeau |
| 3,297,049 A | 1/1967 | Moskovitz |
| 3,425,444 A | 2/1969 | Jones |
| 3,443,579 A | 5/1969 | Doolittle |
| 3,485,441 A | 12/1969 | Eaton, Jr. |
| 3,756,273 A | 9/1973 | Hengesbach |
| 3,773,440 A | 11/1973 | Tateishi |
| 3,936,243 A | 2/1976 | Gakenholz |

(Continued)

FOREIGN PATENT DOCUMENTS

FR   1088616   3/1955

(Continued)

*Primary Examiner*—Ramesh Krishnamurthy
(74) *Attorney, Agent, or Firm*—Jimmy L. Funke

(57) ABSTRACT

A check valve for a fuel pump of a vehicle includes a valve housing adapted to be disposed in an outlet member of the fuel pump. The check valve also includes a valve guide disposed within the valve housing and a valve seat disposed within the valve housing and spaced from the valve guide. The check valve further includes a valve member having an aerodynamic shape disposed within the valve housing and having a closed position to engage the valve seat to prevent fuel from flowing through the outlet member and an open position to cooperate with the valve guide to allow fuel to flow through the outlet member.

15 Claims, 3 Drawing Sheets

U.S. PATENT DOCUMENTS

| | | |
|---|---|---|
| 3,937,250 A | 2/1976 | Golan et al. |
| 3,955,595 A | 5/1976 | Modes |
| 4,003,405 A | 1/1977 | Hayes et al. |
| 4,078,577 A | 3/1978 | Brown |
| 4,129,145 A | 12/1978 | Wynn |
| 4,149,559 A | 4/1979 | Wormser |
| 4,237,918 A | 12/1980 | German |
| 4,275,759 A | 6/1981 | Huang |
| 4,325,343 A | 4/1982 | Turner |
| 4,343,328 A | 8/1982 | Junger |
| 4,352,377 A | 10/1982 | Fritchman |
| 4,424,830 A | 1/1984 | Arnsperger et al. |
| 4,697,995 A | 10/1987 | Tuckey |
| 4,744,387 A | 5/1988 | Otteman |
| 4,756,281 A | 7/1988 | Chen et al. |
| 4,778,354 A | 10/1988 | Idei |
| 4,784,587 A | 11/1988 | Takei et al. |
| 4,799,930 A | 1/1989 | Knoch et al. |
| 4,813,452 A | 3/1989 | Smith |
| 4,874,012 A | 10/1989 | Velie |
| 4,938,254 A | 7/1990 | Gimby |
| 4,964,391 A | 10/1990 | Hoover |
| 5,036,881 A | 8/1991 | Southmayd |
| 5,084,166 A | 1/1992 | Shiraga et al. |
| 5,130,014 A | 7/1992 | Volz |
| 5,320,136 A | 6/1994 | Morris et al. |
| 5,406,922 A | 4/1995 | Tuckey |
| 5,415,146 A | 5/1995 | Tuckey |
| 5,421,306 A | 6/1995 | Talaski |
| 5,513,395 A | 5/1996 | Chlebek et al. |
| 5,525,048 A | 6/1996 | Tuckey |
| 5,577,892 A | 11/1996 | Schittler et al. |
| 5,613,476 A * | 3/1997 | Oi et al. ............... 123/509 |
| 5,623,910 A | 4/1997 | Riggle |
| 5,665,229 A | 9/1997 | Fitzpatrick et al. |
| 5,727,529 A | 3/1998 | Tuckey |
| 5,728,292 A | 3/1998 | Hashimoto et al. |
| 5,785,025 A | 7/1998 | Yoshiume et al. |
| 5,799,688 A | 9/1998 | Yie |
| 5,918,852 A | 7/1999 | Otto |
| 6,070,605 A | 6/2000 | Steenburgh |
| 6,260,530 B1 | 7/2001 | Keon, Jr. |
| 6,341,623 B1 | 1/2002 | Channing |
| 6,401,749 B1 | 6/2002 | Tai et al. |
| 6,422,265 B1 | 7/2002 | Beyer et al. |
| 6,502,557 B2 * | 1/2003 | Moroto et al. ............ 123/506 |
| 6,622,707 B2 | 9/2003 | Begley et al. |
| 6,622,708 B2 | 9/2003 | Braun et al. |

FOREIGN PATENT DOCUMENTS

| | | |
|---|---|---|
| JP | 2078408 | 3/1990 |

* cited by examiner

CHECK VALVE FOR FUEL PUMP

TECHNICAL FIELD

The present invention relates generally to fuel pumps for vehicles and, more particularly, to a check valve for a fuel pump of a vehicle.

BACKGROUND OF THE INVENTION

It is known to provide a fuel tank in a vehicle to hold fuel to be used by an engine of the vehicle. It is also known to provide a fuel pump inside the fuel tank to pump fuel to the engine. Typically, the fuel pump includes a check valve to allow fuel to exit the fuel pump. The check valve generally consists of a checking device, typically a ball or poppet, which is travel limited in the flow direction by a backstop. Oscillations induced by flow turbulence, vortex shedding and/or buoyancy forces cause the checking device to impact the surrounding surfaces, causing pressure pulsations and audible noise. The checking device used in the fuel pump is therefore a potential source of objectionable noise.

One attempt to overcome or lower the objectionable noise is to use a poppet check valve. However, the poppet check valve typically provides low flow restriction at an increased cost, which is undesired.

Therefore, it is desirable to provide a low noise check valve in a fuel pump for a vehicle. It is also desirable to provide a low noise check valve for a fuel pump without compromising low flow restriction. It is further desirable to provide a low noise check valve for a fuel pump at a relatively low cost.

SUMMARY OF THE INVENTION

It is, therefore, one object of the present invention to provide a new check valve for a fuel pump of a vehicle.

It is another object of the present invention to provide a new check valve for a fuel pump that has relatively low noise, low cost, and low flow restriction.

To achieve the foregoing objects, the present invention is a check valve for a fuel pump of a vehicle including a valve housing adapted to be disposed in an outlet member of the fuel pump. The check valve also includes a valve guide disposed within the valve housing and a valve seat disposed within the valve housing and spaced from the valve guide. The check valve further includes a valve member having an aerodynamic shape disposed within the valve housing and having a closed position to engage the valve seat to prevent fuel from flowing through the outlet member and an open position to cooperate with the valve guide to allow fuel to flow through the outlet member.

One advantage of the present invention is that a new check valve is provided for a fuel pump of a vehicle. Another advantage of the present invention is that the check valve has an aerodynamic shape and seat check valve design to provide low flow restriction and quiet or low noise operation. Yet another advantage of the present invention is that the check valve has an airfoil hull shape fluid mechanics to drive the lowest co-efficient of drag forces on the valve for high Reynolds's number flows. Still another advantage of the present invention is that the check valve has a relatively low cost and improves fuel pump performance and efficiency. A further advantage of the present invention is that the check valve meets higher forward flow shut-off performance and higher pump capability due to less restriction and more flow and lower noise operation. Yet a further advantage of the present invention is that the check valve seals when the engine is off in both directions to enhance pump capability and reduce unwelcome noise in the fuel lines.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
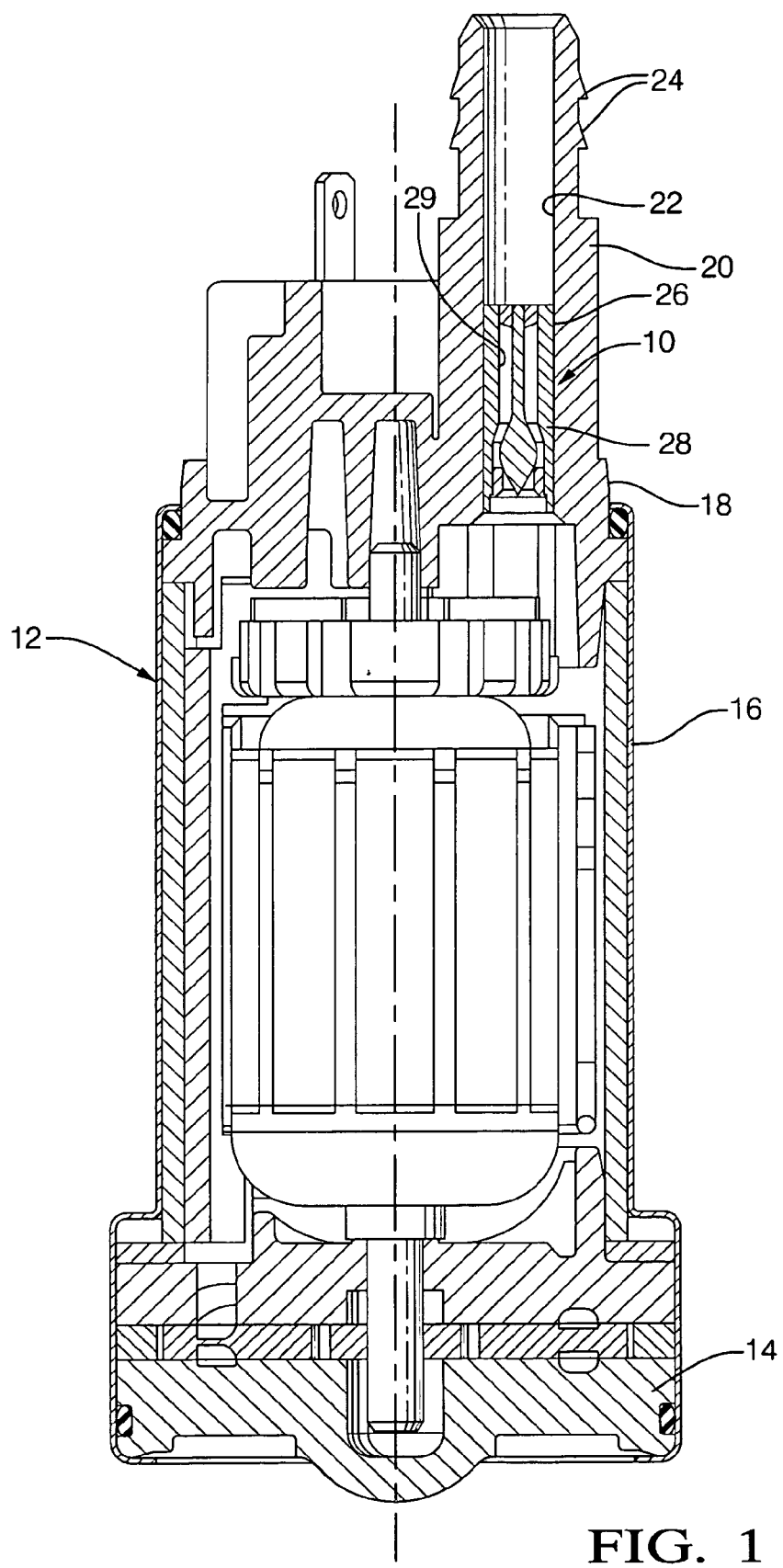
FIG. 1 is a fragmentary elevational view of a check valve, according to the present invention, illustrated in operational relationship with a fuel pump.
Figure 2:
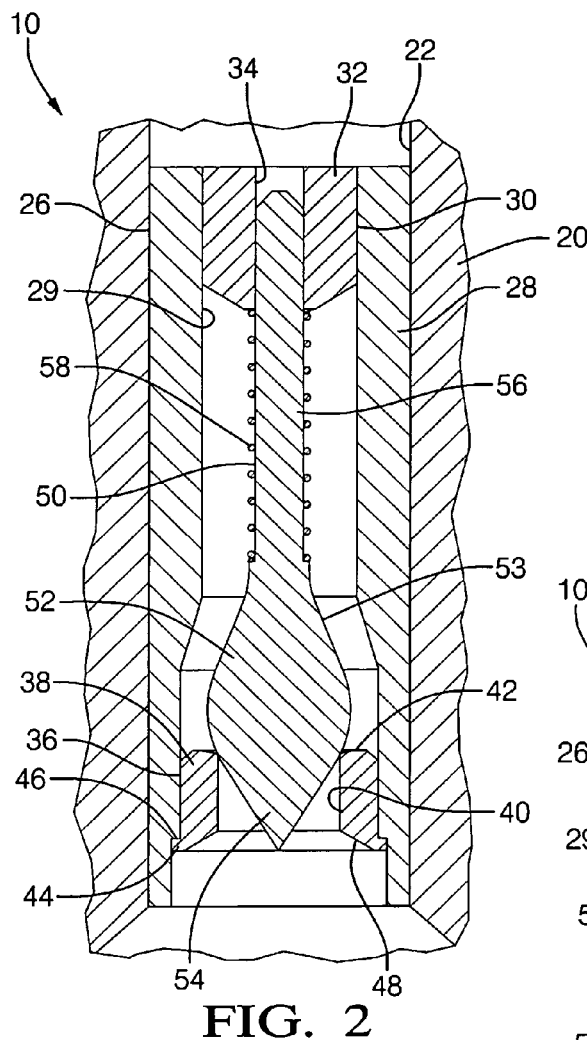
FIG. 2 is an enlarged fragmentary elevational view of the check valve of FIG. 1 illustrating a closed position.
Figure 3:
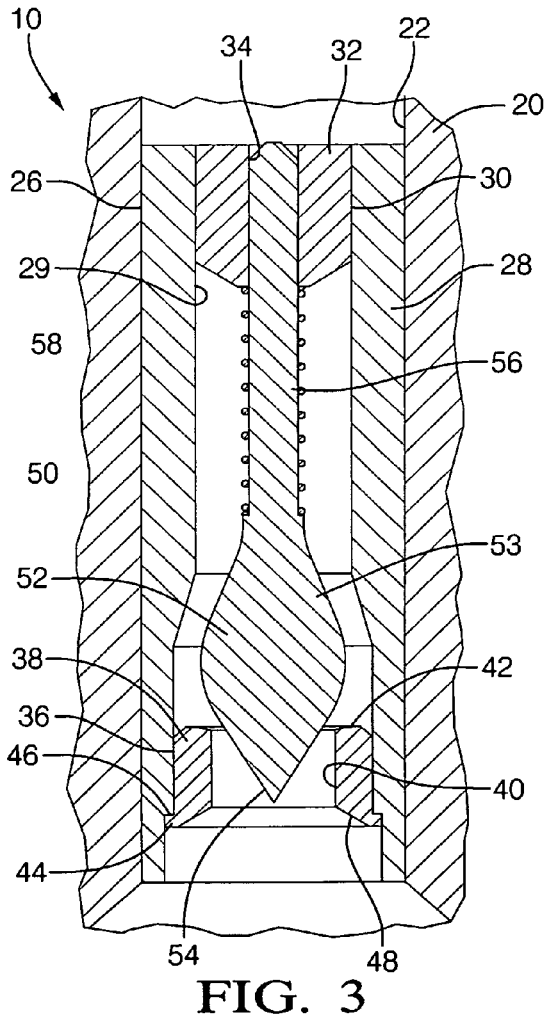
FIG. 3 is a view similar to FIG. 2 illustrating an open position of the check valve.

Referring to the drawings and in particular FIGS. 1 through 3, one embodiment of a check valve 10, according to the present invention, is shown for a fuel pump, generally indicated at 12, of a vehicle (not shown). The fuel pump 12 includes a pump section 14 at one axial end, a motor section 16 adjacent the pump section 14 and an outlet section 18 adjacent the motor section 16 at the other axial end. As known in the art, fuel enters the pump section 14, which is rotated by the motor section 16, and is pumped past the motor section 16 to the outlet section 18. The outlet section 18 has an outlet member 20 extending axially with a passageway 22 extending axially therethrough. The outlet member 20 also has a plurality of projections or barbs 24 extending radially outwardly for attachment to a conduit (not shown). The outlet member 20 also receives the check valve 10 to be described in the passageway 22. It should be appreciated that the fuel flowing to the outlet section 18 flows into the outlet member 20 and through the passageway 22 and the check valve 10 when open to the conduit. It should also be appreciated that, except for the check valve 10, the fuel pump 12 is conventional and known in the art.

Referring to FIGS. 1 through 3, the check valve 10 includes a valve housing 26 extending axially and disposed in the passageway 22 of the outlet member 20. The valve housing 26 has a body portion 28 that is generally tubular in shape and has a generally circular cross-sectional shape. The body portion 28 extends axially and has a passageway 29 extending axially therethrough. The valve housing 26 includes a valve guide 30 disposed in the passageway 29 at one end thereof. The valve guide 30 has at least one, preferably a plurality of support leg portions 32 extending radially to engage the body portion 28. The support leg portions 32 are spaced circumferentially about the valve guide 30. The valve guide 30 has an aperture 34 extending axially therethrough for a function to be described. The aperture 34 has a generally circular cross-sectional shape. The valve housing 26 and valve guide 30 are made of a rigid material such as plastic and formed by suitable molding processes such as injection molding. It should be appreciated that the valve guide 30 is a monolithic structure being integral, unitary, and one-piece. It should also be appreciated that the valve housing 26 is a monolithic structure being integral, unitary, and one-piece.

The check valve 10 includes a valve seat 36 disposed in the passageway 29 at the other end of the valve housing 26 and spaced axially from the valve guide 30 of the valve housing 26. The valve seat 36 has a body portion 38 that is generally cylindrical in shape with a generally circular cross-sectional shape. The valve seat 36 also has an aperture 40 extending axially through the body portion 38. The valve seat 36 has a recess 42 at one end thereof communicating with the aperture 40 for a function to be described. The valve seat 36 also has a flange 44 extending radially from the body portion 38 and disposed annularly thereabout to engage a surface 46 of the passageway 29 of the body portion 28 of the valve housing 26. The valve seat 36 is made of a rigid material such as plastic and formed by suitable processes such as injection molding. It should be appreciated that the valve seat 36 may have an enlarged opening 48 in the aperture 40 opposite the recess 42.

The check valve 10 also includes a valve member 50 disposed in the passageway 29 of the valve housing 26 between the valve guide 30 and the valve seat 36 and cooperating therewith. The valve member 50 is of an aerodynamic shape and extends axially. The valve member 50 has a hub 52 with a tip 54. The hub 52 has an airfoil hull shape for an outer surface 53 to provide a low coefficient of drag for a three-dimensional body. The outer surface 53 provides an eighteen degree (18°) blended backside flow passage for low cavitations and Eddy flows. The hub 52 has a seat diameter to maximum valve diameter ratio of a predetermined amount such as 0.75 for reducing restriction with a valve stability factor of a predetermined amount such as one (1). The tip 54 has a cone shape with an inclusive angle of a predetermined amount such as sixty-four degrees (64°) to enhance stability of the valve member 50 as the fluid stream enters the seat area and the valve area. The tip 54 extends into the aperture 40 of the valve seat 36 and engages the recess 42 in a closed position. The valve member 50 also has a stem 56 extending axially from the hub 52. The stem 56 is generally cylindrical with a generally circular cross-sectional shape. The stem 56 is disposed in the aperture 34 of the valve guide 30 for sliding movement therein. The stem 56 has a length to diameter ratio greater than a predetermined amount such as four (4) to provide balance between valve length and stem diameter, resulting in better stability and/or reduction of wobble/rattle in the fluid stream. The valve member 50 has a first or closed position engaging the valve seat 36 to close the aperture 40 of the valve seat 36 as illustrated in FIG. 2. The valve member 46 has a second or open position cooperating with the valve guide 30 to open the aperture 40 in the valve seat 36 as illustrated in FIG. 3. The valve member 50 is made of a rigid material such as plastic. It should be appreciated that fluid such as fuel flows through the aperture 40 in the valve seat 36, past the valve member 50 and between the spaces of the leg portions 32 of the valve guide 30 and through the passageway 29 when the valve member 50 is in the open position as illustrated in FIG. 3.

The check valve 10 further includes a spring 58 to urge the valve member 50 toward the valve seat 36. The spring 58 is of a coil type. The spring 58 is disposed about the valve member 50 between the hub 52 and the valve guide 30. It should be appreciated that the spring 58 urges the tip 54 of the hub 52 to engage the recess 42 of the valve seat 36 in a closed position. It should also be appreciated that the spring 58 is conventional and known in the art.

Figure 4:
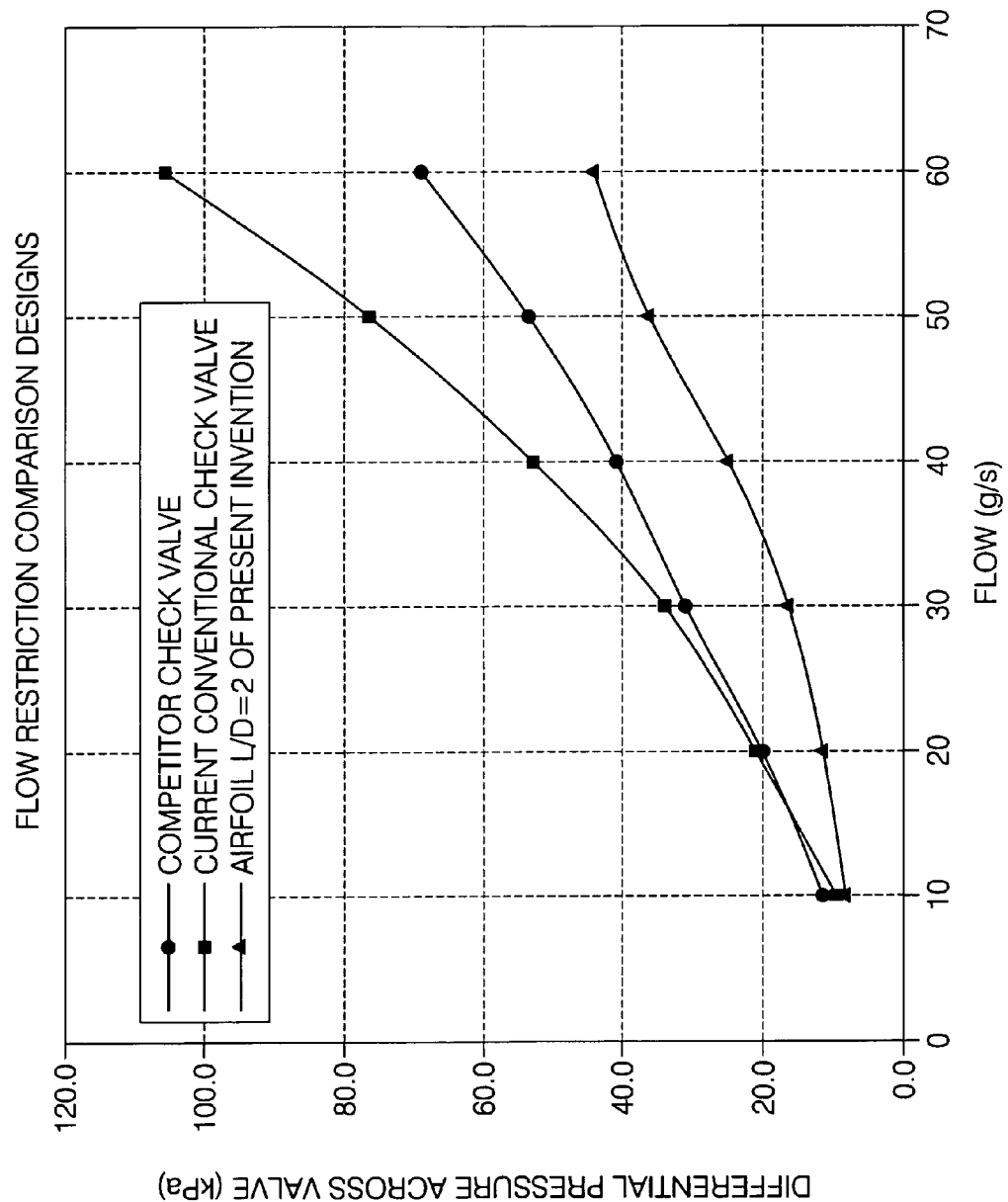
FIG. 4 is a graphical view of differential pressure versus flow for the check valve of FIG. 1.

In operation, the check valve 10 is illustrated in an assembled state in which the valve housing 26 is disposed in the passageway 22 of the outlet member 20 of the fuel pump 12. The valve member 50 engages the valve seat 36 in the closed position as illustrated in FIG. 2. The valve member 50 is contained on the valve seat 36 by the spring 58. Fuel enters the outlet member 20 when the fuel is pumped by the pump section 14 past the motor section 16 to the outlet section 18. In normal operating conditions where the flow of the fuel pump 12 is greater than 20 g/s to the check valve 10, fuel flows, as indicated by the arrow in FIG. 3, to the aperture 40 in the valve seat 36 and causes the valve member 50 to move from the recess 42 in the valve seat 36. The valve member 50 moves to an open position, which is the maximum position desired off of the valve seat 36. In the open position, the valve member 50 allows fuel to flow through the aperture 40 and around the hub 52 of the valve member 50 and past the valve guide 30 through the passageway 29 of the valve housing 26. Fuel flows from the check valve 10 through the passageway 22 of the outlet member 20 to the conduit. In the open position, the valve member 50 is contained and retained in the center of the fuel flow stream by the guide member 30, which guides the stem 56 of the valve member 50. At low flow conditions, the position of the valve member 50 is determined by the spring rate of the spring 58 and distance of the valve member 50 off of the valve seat 36. In the open or retained position, the valve member 50 has a low co-efficient of drag and low flow restriction versus differential pressure across the valve member 50 compared to competitor and current conventional check valves as illustrated in FIG. 4.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A check valve for a fuel pump comprising:
    a valve housing adapted to be disposed in an outlet member of the fuel pump;
    a valve guide disposed in said valve housing;
    a valve seat disposed within said valve housing and spaced from said valve guide;
    a valve member having an aerodynamic shape disposed within said valve housing and having a closed position to engage said valve seat to prevent fuel from flowing through the outlet member and an open position to cooperate with said valve guide to allow fuel to flow through the outlet member;
    wherein said valve member has a hub and a stem extending axially from said hub, said hub having a cone tip; and
    wherein said tip has an inclusive angle of sixty-four degrees.

2. A check valve as set forth in claim 1 wherein said valve seat includes an aperture extending axially therethrough.

3. A check valve as set forth in claim 2 wherein said valve seat has a recess at one end thereof and communicating with said aperture to receive and nest said hub of said valve member in said closed position.

4. A check valve as set forth in claim 1 wherein said valve guide has a passageway extending axially therethrough to receive said stem and guide said stem in said passageway.

5. A check valve as set forth in claim 1 wherein said valve guide includes a plurality of legs extending radially and spaced circumferentially to engage said valve housing and allow fluid to flow therethrough.

6. A check valve as set forth in claim 1 wherein said valve seat has an annular flange extending radially to engage said valve housing.

7. A check valve as set forth in claim 1 including a spring disposed about said stem to urge said hub of said valve member toward said valve seat.

8. A check valve for a fuel pump of a vehicle comprising:
a valve housing adapted to be disposed in an outlet member of the fuel pump, said valve housing having a passageway extending axially therethrough;
a valve guide disposed in said passageway of said valve housing;
a valve seat disposed in said passageway of said valve housing and spaced axially from said valve guide; and
a valve member having a hub of a generally airfoil hull shape and a stem extending axially from said hub, said valve member being disposed within said passageway of said valve housing and having a closed position to engage said valve seat to prevent fuel from flowing through the outlet member and an open position to allow fuel to flow through the outlet member
wherein said hub has an outer surface a backside that provides flow passage of eighteen degrees relative to said stem.

9. A check valve as set forth in claim 8 including a spring disposed about said stem to urge said hub of said valve member toward said valve seat.

10. A check valve as set forth in claim 8 wherein said hub has a cone tip.

11. A check valve as set forth in claim 8 wherein said stem has a length to diameter ratio greater than four.

12. A check valve as set forth in claim 8 wherein said valve seat includes an aperture extending axially therethrough.

13. A check valve as set forth in claim 11 wherein said valve seat has a recess at one end thereof and communicating with said aperture to receive said hub and allow said cone to extend into said aperture when said valve member is in said closed position.

14. A check valve for a fuel pump comprising:
a valve housing adapted to be disposed in an outlet member of the fuel pump, said valve housing having a passageway extending axially therethrough;
a valve guide disposed in said passageway of said valve housing;
a valve seat disposed in said passageway of said valve housing and spaced axially from said valve guide;
a valve member having a hub of an aerodynamic shape and a stem extending axially from said hub, said valve member being disposed within said passageway of said valve housing and having a closed position to engage said valve seat to prevent fuel from flowing through the outlet member and an open position to allow fuel to flow through the outlet member;
wherein said hub has a cone tip; and
wherein said tip has an inclusive angle of sixty-four degrees.

15. A check valve for a fuel pump comprising:
a valve housing adapted to be disposed in an outlet member of the fuel pump;
a valve guide disposed in said valve housing;
a valve seat disposed within said valve housing and spaced from said valve guide;
a valve member having an aerodynamic shape disposed within said valve housing and having a closed position to engage said valve seat to prevent fuel from flowing through the outlet member and an open position to cooperate with said valve guide to allow fuel to flow through the outlet member; and
wherein said valve member has a hub and a stem extending axially from said hub, said hub having a seat diameter to maximum valve diameter ratio of 0.75.

\* \* \* \* \*